Dec. 1, 1959  V. S. FLOYD  2,914,784
APPARATUS FOR GLASS CHIP REMOVAL
Filed April 15, 1957  2 Sheets-Sheet 1
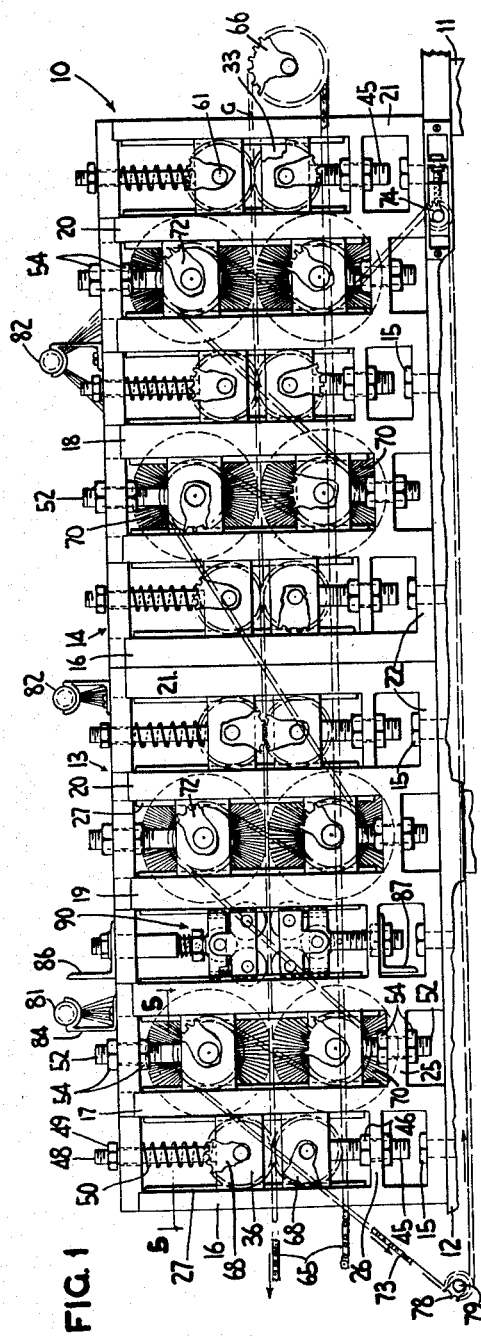
INVENTOR.
VICTOR S. FLOYD
BY
Oscar H. Spencer
ATTORNEY Dec. 1, 1959    V. S. FLOYD    2,914,784
APPARATUS FOR GLASS CHIP REMOVAL
Filed April 15, 1957    2 Sheets-Sheet 2
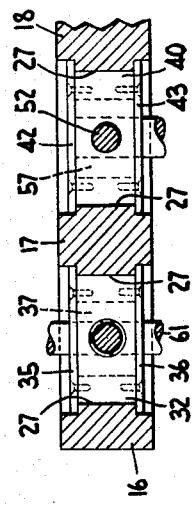
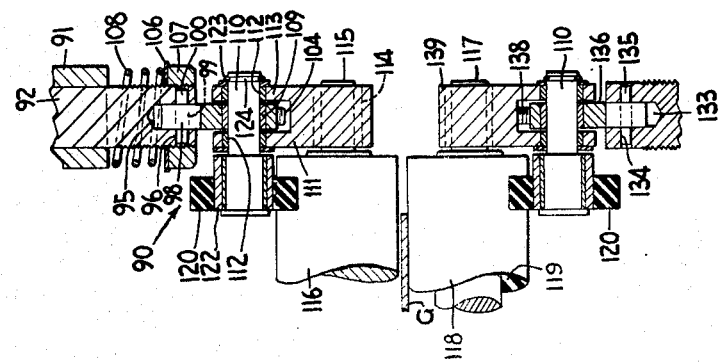
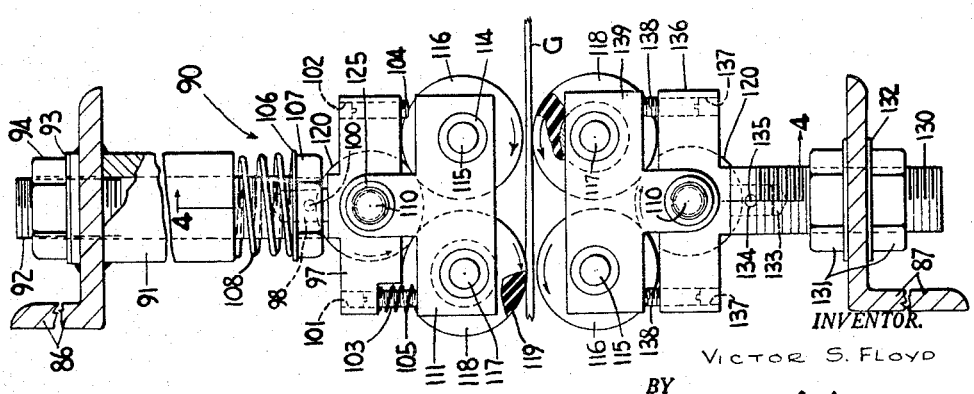
INVENTOR.
VICTOR S. FLOYD
BY
Oscar L. Spencer
ATTORNEY

United States Patent Office 2,914,784
Patented Dec. 1, 1959

2,914,784
APPARATUS FOR GLASS CHIP REMOVAL

Victor S. Floyd, Brackenridge, Pa., assignor to Pittsburgh Plate Glass Company, Allegheny County, Pa., a corporation of Pennsylvania Application April 15, 1957, Serial No. 652,762

15 Claims. (Cl. 15—4)

This invention relates to an apparatus for glass chip removal, i.e., the removal of a glass chip on a surface of a glass sheet.

When a glass sheet is cut to provide smaller glass sheets, there is a tendency for glass chips to be formed and to travel from the place of occurrence to a surface on one of the glass sheets being produced. Some of the glass chips are difficult to remove from the surface of the glass sheet. In such cases the cohesive bond between the chip and the glass sheet is sufficiently strong that the washing of the glass sheet by the application of water and using a brush will not remove some of the chips.

The deleterious effect of unremoved glass chips on subsequent operations in the manufacture of various glass products have been pointed out in a patent application Serial No. 652,761 filed by Herman R. Marini on this date and entitled "Method and Apparatus for Glass Chip Removal." As disclosed in the copending Marini patent application, he has found a method by which the tenaciously adherent glass chips can be removed from surfaces of glass sheets. In this method a rigid body is pressed against a glass chip while supporting the glass sheet. This is done with sufficient pressure to crush or pulverize the glass chips, thereby forming considerably smaller glass particles. The smaller glass particles can be very readily removed from the glass surface by a conventional technique, e.g., by means of a brush and wash water.

In the apparatus that was initially developed for crushing the glass chips a rigid roll, such as a steel roll, was rotatably mounted to a supporting structure. The support for the steel roll was adjustable so that the roll could be positioned in the path of expected travel of glass chips on a glass surface. The steel roll was positioned preferably so that the roll was spaced a very short distance from the expected path of the opposing surface of the glass sheet. However, with variation of the thickness of portions of the glass sheet or variation in the thickness of glass sheets it was found that part of the time the roll would actually contact portions of the glass sheets being passed in a path adjacent the steel roll. Thus, this construction would permit some rolling contact beween the glass sheet and the steel roll when the steel roll is sufficiently closely positioned relative to the sheet to crush the glass chips. The roll would not rotate continuously but only when it contacted the glass sheet.

It is an object of the present invention to provide an apparatus for crushing or pulverizing glass chips on glass sheets in which the apparatus can adjustably maintain the rigid roll at an adjustable distance from the expected opposed surface of the glass sheet.

It is another object of this invention to provide an apparatus in which the rigid roll for crushing the glass chips is rotated indirectly by the moving glass sheet but is maintained out of contact with the glass sheet.

It is still another object of this invention to provide an apparatus for crushing adherent glass chips by the use of a rigid roll that is associated with other parts of the apparatus that automatically maintain the rigid roll a predetermined distance from the glass sheet surface regardless of variations in thickness of the glass sheet or differences in thickness between glass sheets.

A further object of the present invention is to provide a glass chip crusher assembly or apparatus for modification of a glass sheet washer in which the crusher assembly automatically crushes glass chips on both surfaces of glass sheets passing through the washer and automatically maintains the rigid rolls for the crushing action at fixed distances from the opposed surfaces of the sheets regardless of variations in thickness of the sheets.

These and other objects of the present invention will be apparent to one skilled in the art from the description of a preferred embodiment of a crusher assembly which follows as an illustration of a modification of a glass sheet washer when taken in conjunction with the drawings in which like parts are designated by like numerals. The drawings are as follows:

Fig. 1 is a fragmentary elevation, partially broken away, of a glass sheet washer using the glass chip crushing assembly or apparatus of the present invention;

Fig. 2 is a fragmentary plan view of the washer of Fig. 1;

Fig. 3 is an enlarged fragmentary view, partially broken away, taken along the line 3—3 of Fig. 2;

Fig. 4 is a fragmentary vertical cross section taken along the line 4—4 of Fig. 3; and Fig. 5 is an enlarged fragmentary horizontal cross section taken along the line 5—5 of Fig. 1.

Referring to Figs. 1 and 2, a washer generally indicated at 10 has support legs 11 on which are secured a pair of side rails 12. Between the pair of side rails 12 and extending downwardly is a catch pan (not shown). A pair of cast support members generally indicated at 13 and 14 is secured on each of side rails 12 by bolts 15. Each of cast support members 13 and 14 has upright portions 16, 17, 18, 19, 20 and 21.

For both cast support members 13 and 14 there are horizontal portions 22 forming part of the base and joining upright portion 16 to upright portion 17, upright portion 18 to upright portion 19, and upright portion 20 to upright portion 21. Bolts 15 securing cast support members 13 and 14 to side rails 12 are bolted through base portions 22. The upright portions 16 through 21 of cast supports 13 and 14 are also integral with horizontal support portions 25 and 26, the latter joining the upright portions that are joined by base portions 22 and being spaced from base portions 22. Each of opposed surfaces of upright portions 16 and 17, the opposed surfaces of upright portions 17 and 18, the opposed surfaces of upright portions 19 and 20, and the opposed surfaces of portions members 20 and 21 is provided with ribs 27 extending upwardly above horizontal portions 25 and 26. Ribs 27 serve as guide rails. Cap plates 28, 29 and 30 are secured to the top ends of upright portions 16 through 21.

Between upright portions 16 and 17 and between upright portions 20 and 21 for cast support members 13 and 14 and between upright portions 18 and 19 for support members 14 on rails 12 are mounted top and bottom bearing retainers 32 and 33, respectively, each of which is provided with retainer cover plates 35 and 36 screwed thereto. The plates 35 and 36 are wider than bearing retainers 32 and 33. Their vertical margins abut ribs 27, thereby preventing displacement of bearing retainers 35 and 36 or bearings 37 (Fig. 5) in retainers 32 and 33 along the axes of bearings 37. Similarly, top and bottom retainer bearings 40, each with retainer cover plates 42 and 43, are mounted between upright portions 17 and 18, and between upright portions 19 and 20 of cast support members 13 and 14 on rails 12 so that the vertical margins of retainer cover plates 42 and 43 abut ribs 27.

Each of the bottom retainer bearings 33 has an integral threaded rod 45 which extends downwardly through an aperture of larger diameter in horizontal portion 26. The bearing retainer 33 is secured in position by nuts 46 on rod 45. Each of the bearing retainers 32 has an integral rod 48 extending upwardly through a larger aperture in cap plate 28 or 30. The top threaded end of each rod 48 has a nut 49 that limits the downward displacement by gravity of bearing retainers 32. A spring 50 is mounted on rod 48 below cap plate 28 or 30 to oppose upward displacement of bearing retainer 32.

Each of the bearing retainers 40 has an integral threaded rod 52. The threaded rod 52 of each top bearing retainer 40 extends through a larger aperture in cap plate 29. Each top bearing retainer 40 is secured in position by nuts 54 on threaded rod 52. Similarly, the threaded rods 52 of bottom bearing retainers 40 extend through larger apertures in horizontal portions 25 and bearing retainers 40 are secured in position by nuts 54 on threaded rods 52. Bearings 57 are mounted in bearing retainers 40.

The washer 10 is provided with sets of top and bottom pinch rolls 60 for conveying glass sheets G through washer 10. Delivery and take-off conveyors (not shown) of a conventional type are provided at opposite ends of washer 10. Each of the pinch rolls 60 has a steel shaft 61 which is mounted at one end in bearing 37 on cast support member 13 or 14 on one side rail 12 and mounted at the other end in bearing 37 on cast support member 13 or 14 on the other side rail 12. Both ends of shaft 61 extend beyond bearings 37. Roll 60 has a rubber sleeve 62 snugly fitted on shaft 61 between bearings 37.

The rear end (as viewed in Fig. 1) of each shaft 61 of the bottom pinch rolls 60 has keyed thereon a sprocket 64. A chain 65 engages the tops of sprockets 64 and engages an idler sprocket 66 rotatably mounted on a support (not shown). The chain is driven, in a direction indicated by the arrow, by a sprocket and motor (not shown). Gears 68 are keyed on the front ends of shafts 61 of top and bottom rolls 60. The bottom rolls 60 are rotated by chain 65 and sprockets 64 and will rotate top rolls 60 by gears 68.

Nylon brush rolls 70 of a conventional type are mounted in bearings 57 to provide pairs of opposed top and bottom brush rolls 70 for briskly brushing glass sheets that pass between them. The rolls 70 have shafts 71 that extend beyond the front bearings 57. Sprockets 72 are keyed on shafts 71. All of the sprockets 72 are engaged by a chain 73 as shown in Fig. 1, i.e., so that the top brush rolls 70 will rotate in the opposite direction to top pinch rolls 60 and bottom brush rolls 70 also will operate in the opposite direction to bottom pinch rolls 60. The chain 73 engages a sprocket 74 adjustably and rotatably mounted on side rail 12. The chain 73 is driven by a sprocket 78 keyed on shaft 79 mounted on a support (not shown) and rotated by a power source (not shown).

Liquid spray pipe 81 and pipes 82 are mounted on cap plates 28, 29 and 30 on side rails 12 by brackets 84. The liquid spray pipes 81 and 82 are perforated at the bottom as shown in Fig. 2. Water containing a detergent is fed to pipes 82 from a source (not shown). Rinse water is fed to pipe 81 form a source (not shown).

An angle iron 86 is secured to cap plates 30 on cast support members 13. An angle iron 87 is secured to the under surfaces of horizontal portions 26 between upright portions 18 and 19 of cast support members 13. One of the preferred embodiments of a crusher roll assembly of the present invention, that is illustrated in Figs. 1 through 4, is generally indicated at 90. Two of the crusher roll assemblies 90 are mounted between cast support members 13 and are secured to angle irons 86 and 87. In the illustrative embodiment of the present invention, two assemblies 90 are shown because in this modification of a glass sheet washer two sheets of glass G, that have been cut to pattern, are passed through the washer 10 in a side-by-side relationship. One of the assemblies 90 will crush glass chips on one of these sheets G and the other assembly 90 will crush glass chips on the other glass sheet G.

Between cast support members 13 there are four tubes 91 extending vertically through apertures of the horizontal flange of angle iron 86. The tubes 91 are welded to angle iron 86. Rods 92 threaded at both ends extend through tubes 91 and have washers 93 and nuts 94 on the top ends to limit downward movement of rods 92. The bottom threaded end of each of rods 92 has a central hole 95 and transverse apertures 96. A support bar 97 has a central upstanding boss or stud 98 with an aperture 99. A pin 100 is mounted in aperture 99 of stud 98 and in transverse apertures 96 and rod 92. The ends of support bar 97 are provided with vertical threaded apertures 101 and 102 in which are mounted set screws 103 and 104. A bottom corner of support bar 97 is cut out to place a spring 105 around the lower portion of set screw 103. The bottom end of rod 92 has a washer 106 and nut 107 mounted thereon. A spring 108 is on rod 92 between tube 91 and washer 106. The nut 107 also retains pin 100 within apertures 96 and 99.

The support bar 97 is provided with a horizontal aperture parallel to aperture 99 and normal to and between apertures 101 and 102. A bearing 109 and stub shaft 110 are mounted in this aperture of support bar 97. A roll support or bearing housing 111 is pivotally mounted to support bar 97 by means of shaft 110 extending through bearings 112 in apertures in a clevis extension 113 of roll support 111. Each of the roll supports 111 has bearings 114 mounted in apertures. Shafts 115 of a steel roll 116 and shafts 117 of pilot roll 118 are mounted in bearings 114. The pilot roll 118 has a central steel shaft 117 and a snugly fitting rubber, such as neoprene, sleeve 119 so that it has the construction of pinch rolls 60. A narrow rubber-sleeved tubular roll 120 is rotatably mounted by bearing 122 on shaft 110. The sizes of rubber roll 120, steel roll 116 and pilot roll 118 and their positioning are chosen so that the rotation of roll 118 will cause rotation of steel roll 116 through frictional engagement of roll 120 with both rolls 116 and 118. The shaft 110 is held on support bar 97 by a snap ring 123 in a groove 124 of shaft 110 and abutting one of washers 125.

Four threaded rods 130 are secured to angle iron 87 by means of nuts 131 and washers 132. The rods 130 extend upwardly through larger apertures in angle iron 87. The top end of each of rods 130 is provided with a central hole 133 which is in alignment with transverse apertures 134. A pin 135 is in apertures 134 and a transverse aperture of a support bar 136 similar to support bar 97 except bar 136 does not have a corner cut away. The support bar 136 is provided with threaded apertures 137 containing set screws 138. The bar 136 pivotally mounts a roll support 139 by shaft 110 in the manner described above for roll support 111. Likewise, roll supports 139 rotatably support bottom steel roll 116, bottom pilot roll 118 and bottom rubber roll 120.

Referring to Figs. 1 and 3, rods 130 are positioned by nuts 131 above and below angle iron 87 so that the tops of bottom pilot rolls 118 are in a horizontal plane with the tops of bottom rolls 60. By adjustment of set screws 138, the tops of bottom steel rolls 116 are slightly below this horizontal plane. The distance is preferably about 0.002 inch. The rods 92 are positioned by nuts 94 on tubes 91 of the top portion of crusher assembly 90 so that top pilot rolls 118 will have their bottom surfaces in a plane, before passage of a glass sheet, slightly below the expected plane of the top surface of the glass sheets. Each of rolls 118 will be raised slightly when the glass sheet G is conveyed through the washer and engages top pilot roll 118, as well as bottom pilot roll 118. The upward movement of top roll 118 is limited by set screw 103. Thus the top roll 118 is raised further by raising rod 92 within tube 91. This movement is opposed by spring 108, so that frictional engagement of top roll 118 against the top surface of the moving glass sheet results in rotation of top roll 118. Upward movement of top roll 118 by pivoting about shaft 110, being limited by set screw 103, will not move steel roll 116 toward the glass sheet G any closer than the desired spacing, e.g., about 0.002 inch.

Glass sheets will vary in thickness. When the glass sheet passing between top and bottom pilot rolls 118 or a portion of the sheet is thicker than the expected thinnest sheet being passed through the washer, the top roll 118 is prevented, of course, from rotating further about shaft 110 because of set screw 103. Then the entire assembly of top rolls 116 and 118, top roll supports 111 and support bars 97 with rods 92 will move upwardly against the opposing force of springs 108. This type of movement will maintain the desired spacing between top steel rolls 116 and the top surface of glass sheet G.

Various modifications of the apparatus of the invention will be apparent to one skilled in the art. The foregoing description has been presented for purpose of illustration only and not by way of limitation. The invention is limited only by the claims which follow.

I claim:

1. An apparatus for the crushing of glass chips on a surface of a glass sheet which comprises a pair of spaced bearing housings, a rigid roll and a resilient roll each rotatably mounted on the bearing housings about an axis, and support means pivotally mounting the bearing housings about an axis, said axis of pivotal mounting of the bearing housings and said axes of the rigid roll and the resilient roll having a fixed relationship and said rigid roll and said resilient roll being constructed and arranged so that a plane tangential to said rigid roll passes through said resilient roll and is spaced a short distance from a parallel plane tangential to said resilient roll and spaced from said rigid roll.

2. An apparatus for the crushing of glass chips on a surface of a glass sheet which comprises a pair of spaced bearing housings, a rigid roll and a resilient roll each rotatably mounted on the bearing housings about an axis, and support means pivotally mounting the bearing housings about an axis, said axis of pivotal mounting of the bearing housings and said axes of the rigid roll and the resilient roll having a fixed relationship, said rigid roll and said resilient roll being constructed and arranged so that a plane tangential to said rigid roll passes through said resilient roll and is spaced a short distance from a parallel plane tangential to said resilient roll and spaced from said rigid roll, and said axis of pivotal mounting of the bearing housings being outside the plane passing through the axes of rotation of the rolls.

3. An apparatus for the crushing of glass chips on a surface of a glass sheet which comprises a pair of spaced bearing housings, a rigid roll and a resilient roll each rotatably mounted on the bearing housings about an axis, support means pivotally mounting the bearing housings about an axis, said axis of pivotal mounting of the bearing housings and said axes of the rigid roll and the resilient roll having a fixed relationship, said rigid roll and said resilient roll being constructed and arranged so that a plane tangential to said rigid roll passes through said resilient roll and is spaced a short distance from a parallel plane tangential to said resilient roll and spaced from said rigid roll, and said axis of pivotal mounting of the bearing housings being outside the plane passing through the axes of rotation of the rolls, and means for limiting the movement of the bearing housings about their pivotal axis.

4. The apparatus of claim 3 wherein the means for limiting the movement of the bearing housing about their pivotal axis is an adjustable stop means mounted to the support means.

5. An apparatus for the crushing of glass chips on a surface of a glass sheet which comprises a pair of spaced bearing housings, a rigid roll and a resilient roll each rotatably mounted on the bearing housings about an axis, support means pivotally mounting the bearing housings about an axis, said axis of pivotal mounting of the bearing housings and said axes of the rigid roll and the resilient roll having a fixed relationship, said rigid roll and said resilient roll being constructed and arranged so that a plane tangential to said rigid roll passes through said resilient roll and is spaced a short distance from a parallel plane tangential to said resilient roll and spaced from said rigid roll, and said axis of pivotal mounting of the bearing housings being outside the plane passing through the axes of rotation of the rolls, means adjustably mounted to the supporting means for limiting the movement of the bearing housings about their axis, and means for resiliently urging the bearing housings out of contact with the limit means.

6. An apparatus for the crushing of glass chips on a surface of a glass sheet which comprises a fixed supporting structure, a pair of spaced bearing housings, a rigid roll and a resilient roll each rotatably mounted about an axis on the bearing housings, support means pivotally mounting the bearing housings about an axis, said axis of pivotal mounting of the bearing housings and said axes of the rigid roll and the resilient roll having a fixed relationship, said rigid roll and said resilient roll being constructed and arranged so that a plane tangential to said rigid roll passes through said resilient roll and is spaced a short distance from a parallel plane tangential to said resilient roll and spaced from said rigid roll, and said axis of pivotal mounting of the bearing housings being outside the plane passing through the axes of rotation of the rolls, means for limiting the upward movement of the resilient roll by limiting the movement of the bearing housings about their axis, means for resiliently urging the bearing housings out of contact with the limit means, vertical tubes supported by said fixed supporting structure, said support means including rods extending upwardly through the tubes, and stop means mounted on the rods above the tubes and supported by the tubes.

7. The apparatus of claim 6 wherein the stop means are adjustably mounted on the rods.

8. The apparatus of claim 7 and further including means for resiliently opposing the upward movement of the rods in the tubes.

9. An apparatus for the crushing of glass chips on a surface of a glass sheet which comprises a pair of spaced bearing housings, a rigid roll and a resilient roll each rotatably mounted on the bearing housings about an axis, means for rotating the rigid roll, said means being driven by said resilient roll, and support means pivotally mounting the bearing housings about an axis parallel to the axes of rotation of the rolls, said rigid roll and said resilient roll being constructed and arranged so that a plane tangential to said rigid roll passes through said resilient roll and is spaced a short distance from a parallel plane tangential to said resilient roll and spaced from said rigid roll.

10. The apparatus of claim 9 wherein the means for rotating the rigid roll is a friction roll rotatably mounted to one of the bearing housings on an axis coincident with the pivotal axis for the bearing housings and further including means for limiting the movement of the bearing housings about their pivotal axis, and means for resiliently urging the bearing housings out of contact with the limit means.

11. An apparatus for the crushing of glass chips on a surface of a glass sheet which comprises a fixed supporting structure, a pair of vertical tubes rigidly mounted to the supporting structure, and a pair of spaced bearing housings, a rigid roll and a resilient roll each rotatably mounted on the bearing housings about an axis, support means pivotally mounting the bearing housings about an axis parallel to and outside the plane passing through the axes of rotation of the rolls, said support means including a pair of horizontal bars, a pair of rods secured to the pair of horizontal bars and extending upwardly from the bars and through said pair of vertical tubes, stop means secured to the rods and resting on the tubes, adjustable stop means mounted on the rods below the tubes, springs on the rods between and contacting the tubes and the adjustable stop means for opposing upward movement of the rods, set screws extending vertically from the bars of the support means to limit the upward movement of the resilient roll with movement of the bearing housings about their pivotal axis, and springs on the set screw and engaging the bar at one end and one of the bearing housings at the other to urge the downward movement of the resilient roll by movement of the bearing housings away from the set screws, said rigid roll and said resilient roll being so constructed and arranged that the bottom of said resilient roll is below the bottom of said rigid roll.

12. The apparatus of claim 11 and further including friction rolls rotatably mounted about the pivotal axis on the bearing housings and contacting the rigid roll and the resilient roll for driving the rigid roll upon rotation of the resilient roll.

13. An apparatus for the washing of glass sheets including removal of glass chips which comprises a conveyor for moving glass sheets in a horizontal path, a fixed supporting structure, pairs of spaced top and bottom bearing housings above and below the horizontal path, top and bottom rigid rolls and top and bottom resilient rolls each respectively rotatably mounted on the top and bottom bearing housings, top support means pivotally mounting the top bearing housings about an axis parallel to and above the axes of rotation of the top rigid and resilient rolls, vertical tubes mounted to the supporting structure, rods threaded at both ends extending through the tubes and secured at their bottom ends to the top support means, top nuts on the rods above the tubes, bottom nuts on the rods below the tubes, springs on the rods between the tubes and the bottom nuts for opposing upward movement of the rods, set screws vertically mounted by the top support means and contacting the top bearing housings upon upward movement of the top resilient roll, springs between the top support means and the top bearing housings and positioned by the set screws for urging the top resilient roll downwardly, bottom support means adjustably mounted to the fixed supporting structure, said bottom bearing housings being pivotally mountneed to the bottom support means about an axis parallel to the axes of rotation of the bottom rigid and resilient rolls, and set screws mounted in the bottom support means and contacting the bottom bearing housings to adjustably position the top of the bottom resilient roll above the top of the bottom rigid roll, said top rigid roll opposing said bottom resilient roll and said top resilient roll opposing said bottom rigid roll, said top rigid roll and said top resilient roll being constructed and arranged so that the bottom of said top resilient roll is below the bottom of said top rigid roll.

14. The apparatus of claim 13 and further including friction rolls rotatably mounted about the pivotal axes of the top and bottom bearing housings and contacting the top and bottom rigid rolls and the top and bottom resilient rolls for driving the top and bottom rigid rolls upon rotation of the top and bottom resilient rolls.

15. The apparatus of claim 14 wherein the conveyor includes pairs of pinch rolls rotatably mounted on the supporting structure to move the glass sheets in the horizontal path and means for driving said pairs of pinch rolls, and further including pairs of brush rolls rotatably mounted to the supporting structure between the pairs of pinch rolls to engage the glass sheets moved by said pairs of pinch rolls and means for driving said pairs of brush rolls, the top and bottom rigid rolls and resilient rolls being between two pairs of said brush rolls.

References Cited in the file of this patent

UNITED STATES PATENTS

| | | |
|---|---|---|
| 582,952 | Roberts | May 18, 1897 |
| 1,317,714 | Locke | Oct. 7, 1919 |
| 2,453,339 | Peterson | Nov. 9, 1948 |

UNITED STATES PATENT OFFICE
CERTIFICATE OF CORRECTION

Patent No. 2,914,784            December 1, 1959

Victor S. Floyd

It is hereby certified that error appears in the printed specification of the above numbered patent requiring correction and that the said Letters Patent should read as corrected below.

Column 3, line 67, for "form" read -- from --; column 4, line 20, for "and", second occurrence, read -- of --; column 8, line 12, for "mountneed" read -- mounted --; line 34, for "mounted to" read -- mounted on --.

Signed and sealed this 27th day of September 1960.

(SEAL)
Attest:

KARL H. AXLINE            ROBERT C. WATSON

Attesting Officer            Commissioner of Patents